United States Patent Office 3,279,930
Patented Oct. 18, 1966

3,279,930
CERAMIC PRODUCT AND ITS PREPARATION
Roland R. Van Der Beck, Jr., Somerville, N.J., assignor to Foote Mineral Company, Exton, Pa., a corporation of Pennsylvania
No Drawing. Filed June 25, 1964, Ser. No. 378,071
11 Claims. (Cl. 106—39)

The present invention relates to a novel ceramic product and to its preparation; and, more particularly, the invention relates to a ceramic product prepared using a substantial proportion of clay as one of the raw materials but which, in spite of the use of the clay, has an extremely low coefficient of thermal expansion.

Clay is the classical raw material for preparing ceramic products; and, despite technical superiority of certain other ceramic-forming materials, the great volume of ceramic products, like refractories, sanitary ware, tile, dinnerware, and the like is based on clay systems. Clay based ceramic product and their manufacture, however, have certain limitations due to the thermal expansion characteristics thereof. There are many advantages in substantially reducing the thermal expansion of clay-based ceramics, and these would be manifested not only in applications of the product through improved thermal shock resistance but also in manufacturing operations through decreased firing times and reduced losses from dunting (cracking due to too rapid heating or cooling).

Petalite and spodumene are known to possess very low coefficients of thermal expansion, $0.15 \times 10^{-6}$ in./in./° C. for petalite and $0.8 \times 10^{-6}$ in./in./° C. for spodumene. Petalite has been suggested as an additive to clay to provide a product of reduced coefficient of thermal expansion, but its use has not been significant because the results are not justified by the added cost. It requires at least 60% of petalite (by weight, based on the weight of petalite plus clay) to reduce the coefficient of thermal expansion to below $1 \times 10^{-6}$ in./in./° C. Below that proportion of petalite the coefficient of thermal expansion increases sharply. Addition of small amounts up to about 10% of petalite to clay causes an abrupt sharp increase of the coefficient of thermal expansion above that of the clay alone. This is also true of spodumene. Because petalite itself has a coefficient of thermal expansion much lower than that of spodumene and because of the above-mentioned limitations of petalite, it was expected that spodumene would be even less suitable.

It is the principal object of the present invention to provide clay based ceramic products having a very low coefficient of thermal expansion.

It is another object of the present invention to provide a method for making ceramic products having a low coefficient of thermal expansion using clay as one of the principal raw materials.

These and other objects will become apparent from a consideration of the following specification and claims.

The method of the present invention comprises sintering an intimate mixture consisting essentially of finely-divided clay and of finely-divided spodumene in a proportion of from about 40 to about 60% of the former to from about 60 to about 40% of the latter, by weight, and based on the combined weight of the two stated materials at a cone, below the melting point of the mass, at which the spodumene takes silica from the clay to form β-spodumene solid solution and converts the clay to mullite, to provide a mullite content of between about 14 and about 36%, by weight, based on the combined weight of mullite and β-spodumene solid solution.

Ceramic products prepared according to the present invention possess very low coefficients of thermal expansion, less than $1 \times 10^{-6}$ in./in./° C., from room temperature to 600° C. (hereinafter for convenience only figures will be given for this coefficient it being understood that the units are in./in./° C. in a temperature range from room tempearture to 600° C.) in spite of the relatively large clay content. Georgia kaolin, for example, has a coefficient of thermal expansion of about $3.5 \times 10^{-6}$ after firing at cone 12 or 13, and the addition of 10% of spodumene (based on the mixture) raises the coefficient to around $8 \times 10^{-6}$. The same kaolin after firing at cone 14 has a coefficient of about $7.3 \times 10^{-6}$ and the addition of 10% of spodumene has no apparent effect on the coefficient. Combinations of petalite and clay in the same range of proportions referred to in the preceding paragraph when fired at cones 14 to 16 provide ceramic products having coefficients of about $2.5 \times 10^{-6}$ or higher. When fired at cone 12, only the compositions containing 60% or more of petalite provide coefficients below $1.0 \times 10^{-6}$. It will be seen, therefore, that the products of the present invention have low coefficients of thermal expansion which are entirely unexpected.

Referring to the two principal materials used in accordance with the present invention, one of these is spodumene. This is a lithium aluminum silicate having the theoretical formula of $1Li_2O:1Al_2O_3:4SiO_2$. Either the α- or β- form of spodumene may be used, the latter being prepared by calcining the former as is well known. When α-spodumene is used it becomes converted to β-spodumene during the sintering operation.

The clay will be an alumino silicate having a molar ratio of $Al_2O_3$ to $SiO_2$ of from about 1:2, as in Georgia kaolin, to about 1:4, as in ball clay. Mixtures of such clays, as well as other clays, which have molar ratios of $Al_2O_3$ to $SiO_2$ intermediate this range, may be used.

To insure that the desired reactions take place the spodumene and the clay should be in finely-divided condition. While each may be such that substantially all thereof passes through a 100 mesh screen, it is preferred that substantially all of the clay and spodumene passes through a 200 mesh screen.

In carrying out the process of the invention to produce the novel products, the clay and the spodumene are mixed and sintered. The materials may be mixed dry and sintered, especially when it is desired simply to form a granular product, or a small amount of water may be added to form a plastic mix which can be shaped before sintering when a shaped ceramic body is desired. In preparing the mixture for sintering, minor amounts of conventional binders, fluxing agents, and the like commonly used in the ceramic industry may be employed, but such additives are not essential. Whether or not such additives are present, the mixture is considered to consist essentially of the clay and spodumene.

During sintering, the reactions discussed below take place in essentially the solid state, although some interfacial fusion might take place.

In order to obtain a ceramic product having the described low coefficient of thermal expansion, the mixture must not be heated to the melting point of the mass. The time-temperature conditions will be sufficient substantially to convert the clay to mullite ($3Al_2O_3:2SiO_2$) and for the spodumene to assimilate the silica exsolved by such conversion to form β-spodumene solid solution. Spodumene ($1Li_2O:1Al_2O_3:4SiO_2$) is capable of assimilating up to four more mols of $SiO_2$ so that β-spodumene solid solution could contain from above 4 to 8 mols of $SiO_2$ for each mol of $Li_2O$ and of $Al_2O_3$. However, in the present products the β-spodumene solid solution has from about 6 to 8 mols of $SiO_2$, depending upon the clay used.

The exact time-temperature conditions employed will depend primarily upon the nature of the clay and the proportion thereof in the mixture of spodumene and clay, although it will be apparent to ceramists that the particular particle size of the materials and the presence or absence of a flux may also have a bearing. Thus, ball clay is less refractory than kaolin; and when ball clay alone is employed as the clay the time-temperature conditions in general will be lower than when kaolin is the only clay used, for a given proportion of clay. This will be illustrated in the examples hereinafter set forth. However, for any particular clay-spodumene combination, within the proportions set forth above and with a clay as herein defined, no difficulty will be encountered by the ceramist in determining the time-temperature conditions applicable since the conversion of the spodumene-clay mixture essentially to the desired mullite-β-spodumene solid solution readily can be seen from X-ray diffraction patterns. In general it may be stated that the time-temperature conditions used to provide the desired sintering-reactions will be within the range of from Orton cone 12 to Orton cone 16.

Specifically with respect to the use of kaolin only as the clay, heating (firing) the spodumene-kaolin mixture at cones (Orton) below 14 results in products where coefficients of thermal expansion are in the neighborhood of $2 \times 10^{-6}$ or above, and firing at cones above 16 also results in high coefficients of thermal expansion. In fact, firing at cones 15 and 16 a mixture of kaolin and spodumene in the lower portion of the spodumene range, below 50% to 40% spodumene, results in high coefficients and in products where X-ray diffraction studies show no β-spodumene solid solution.

Specifically with respect to the use of ball clay only as the clay, heating the spodumene-ball clay mixture at cones below 12 results in products where coefficients of thermal expansion are in the neighborhood of $2 \times 10^{-6}$ or above, and firing at cones above 16 also results in high coefficients of thermal expansion. In fact, firing, at cone 12, a mixture of ball clay and spodumene in the upper portion of the spodumene range, above 40% to 60% spodumene, results in coefficients above $1 \times 10^{-6}$.

Hence the firing conditions as defined by cone selected from 12 to 16 will be correlated with the nature of the clay selected as well as on the proportion of spodumene to clay so that the stated reactions occur to provide in the product β-spodumene solid solution in an amount from about 64 to about 86% and mullite in an amount from about 14 to about 36% by weight and based on the weight of the two materials. The presence of each of these can be determined by standard X-ray diffraction tests.

The resulting product will consist essentially of the thermally merged clay and spodumene in which silica has been removed from the clay to form mullite ($3Al_2O_3:2SiO_2$) and associated with the spodumene to form β-spodumene solid solution in which there are from about 6 to 8 mols of $SiO_2$ per mol of $Li_2O$ and of $Al_2O_3$. The present products consist essentially of the mullite and β-spodumene solid solution, intimately mixed and having a content of each as referred to herein above. The mullite and β-spodumene solid solution are crystalline although some of the latter may also be present as a glassy phase. X-ray diffraction studies show no significant amount of cristobalite or quartz or even β-spodumene as such, so that the product is substantially free of these. The overall oxide analysis will be from about 3 to about 5% $Li_2O$; from about 27 to about 38% $Al_2O_3$, and from about 58 to about 70% $SiO_2$.

When the product is to be prepared in granular form, the product after firing if not of the desired particle size may be ground. The present product in finely divided granular form is particularly preferred as a material from which other ceramic products may be prepared. Thus for use in slip casting, the product should be such that substantially all thereof passes through a 325 mesh screen. For preparing castable refractories a particle size distribution from coarse, like substantially through 20 and on 50 mesh, to fine, like substantially through 200 mesh is preferred. The fines may make up from about 40 to about 60% of such a mixture, with the coarse particles making up the difference.

The invention will be more readily understood from a consideration of the following examples which are given for the purpose of illustration only and are not intended to limit the scope of the invention in any way.

*Examples I–IX*

Using α-spodumene (all through 200 mesh) and Georgia kaolin (all through 325 mesh) cylinders ½" in diameter and 5" long are extruded from mixtures of the spodumene and the clay as follows: (I) 40 parts, by weight, spodumene: 60 parts clay; (II) 50 parts spodumene: 50 parts clay, and (III) 60 parts spodumene: 40 parts clay. Different cylinders of each composition are fired at Orton cones 14, 15 and 16, respectively. Firing shrinkage is determined by measuring the distance between two marks on the surface of each cylinder. Coefficients of thermal expansion are measured in a fused quartz dilatometer from room temperature (about 20° C.) to 600° C.

The results are tabulated as follows:

| | Percent Spodumene | Cone | Percent Firing Shrinkage | Coefficient of Thermal Expansion (in./in./° C.) |
|---|---|---|---|---|
| I | 40 | 14 | 7.3 | $0.7 \times 10^{-6}$ |
| II | 40 | 15 | 7.0 | $2.3 \times 10^{-6}$ |
| III | 40 | 16 | 6.5 | $3.65 \times 10^{-6}$ |
| IV | 50 | 14 | 5.7 | $0.17 \times 10^{-6}$ |
| V | 50 | 15 | 5.1 | $0.09 \times 10^{-6}$ |
| VI | 50 | 16 | 5.7 | $0.65 \times 10^{-6}$ |
| VII | 60 | 14 | 5.5 | $-0.19 \times 10^{-6}$ |
| VIII | 60 | 15 | 5.7 | $-0.42 \times 10^{-6}$ |
| IX | 60 | 16 | | $-0.24 \times 10^{-6}$ |
| 0 | (100% kaolin) | 14 | 11.9 | $7.39 \times 10^{-6}$ |

X-ray diffraction studies show only mullite and β-spodumene solid solution in Examples I and IV–IX. Example II shows mullite and a weak indication of β-quartz; and Example III shows only mullite.

*Example X–XIV*

Following the procedure of Examples I–IX, the coefficients of thermal expansion are measured for ceramic bodies prepared from various mixtures of ball clay and α-spodumene as follows:

| | Percent Spodumene | Cone | Coefficient of Thermal Expansion (in./in./° C.) |
|---|---|---|---|
| X | 40 | 12 | $0.98 \times 10^{-6}$ |
| XI | 40 | 13 | $0.59 \times 10^{-6}$ |
| XII | 40 | 14 | $0.20 \times 10^{-6}$ |
| XIII | 50 | 13 | $0.03 \times 10^{-6}$ |
| XIV | 60 | 13 | $0.47 \times 10^{-6}$ |

X-ray diffraction studies show mullite and β-spodumene solid solution in all of Examples X–XIV, and in Examples X and XIII, also a trace of β-quartz.

Modification is possible in the exact make-up of the present compositions and in the particular procedure used in making them without departing from the scope of the present invention.

I claim:

1. The method of making a novel ceramic product which comprises sintering a mixture consisting essentially of finely-divided clay and finely-divided spodumene, substantially all of said clay and spodumene passing through a 100 mesh screen, in a proportion of from about 40 to about 60% of the former to from about 60 to about 40% of the latter, by weight, based on the combined weight of the clay and spodumene, at a cone, below the melting point of the mass, at which the spodumene takes silica from the clay to form β-spodumene solid solution and converts the clay to mullite to provide a mullite content of between about 14 and about 36%, by weight, based on the combined weight of the mullite and β-spodumene solid solution.

2. The method of claim 1 wherein the cone is not below Orton cone 12 nor above cone 16.

3. The method of claim 1 wherein substantially all of said clay and spodumene pass through a 200 mesh screen and wherein the resulting product is in granular form.

4. The method of claim 1 wherein the clay is an alumino silicate having a molar ratio of $Al_2O_3$ to $SiO_2$ of from about 1:2 to about 1:4.

5. The method of claim 4 wherein the β-spodumene solid solution has from about 6 to 8 mols of $SiO_2$ per mol of $Li_2O$ and of $Al_2O_3$.

6. A ceramic product consisting essentially of an intimate sintered mixture of clay and spodumene in a proportion of from about 40 to about 60%, of the former to from about 60 to about 40% of the latter, said product having a coefficient of thermal expansion not appreciably in excess of $1 \times 10^{-6}$ in./in./° C. and showing by X-ray diffraction essentially mullite and β-spodumene solid solution in which there are from about 6 to 8 mols of $SiO_2$ per mol of $Li_2O$ and of $Al_2O_3$.

7. The product of claim 6 wherein the mullite is present in an amount between about 14 and about 36% by weight, based on the weight of the mullite and the β-spodumene solid solution.

8. A ceramic product consisting essentially of an intimate sintered mixture of clay and spodumene, said product having a coefficient of thermal expansion not appreciably in excess of $1 \times 10^{-6}$ in./in./° C. and showing by X-ray diffraction essentially mullite and β-spodumene solid solution in which there are from about 6 to 8 mols of $SiO_2$ per mol of $Li_2O$ and of $Al_2O_3$, the mullite being present in an amount between about 14 and about 36%, by weight, based on the weight of the mullite and the β-spodumene solid solution.

9. The product of claim 6 in granular form.
10. The product of claim 7 in granular form.
11. The product of claim 8 in granular form.

References Cited by the Examiner

UNITED STATES PATENTS

| | | | |
|---|---|---|---|
| 2,785,080 | 3/1957 | Hummel | 106—65 |
| 2,880,098 | 3/1959 | Jones | 106—68 |

TOBIAS E. LEVOW, *Primary Examiner.*

J. POER, *Assistant Examiner.*